United States Patent [19]

Fabbri

[11] Patent Number: 4,914,992
[45] Date of Patent: Apr. 10, 1990

[54] DEVICE FOR IMPROVING THE FEED OF A BAR IN AN AUTOMATIC LATHE FOR MACHINING BARS

[75] Inventor: Vladimiro Fabbri, Faenza, Italy
[73] Assignee: I.E.M.C.A. S.P.A., Faenza, Italy
[21] Appl. No.: 252,481
[22] Filed: Sep. 30, 1988

[30] Foreign Application Priority Data

Oct. 14, 1987 [IT] Italy .................................. 3650 A/87

[51] Int. Cl.$^4$ ............................................ B23B 13/02
[52] U.S. Cl. ....................................... 82/127; 82/163; 414/18
[58] Field of Search ...................... 82/2.5, 38 R, 38 A; 414/18

[56] References Cited

U.S. PATENT DOCUMENTS

| | | | |
|---|---|---|---|
| 2,759,735 | 8/1956 | Cross | 82/2.5 |
| 4,324,162 | 4/1982 | Uehara | 82/2.5 |
| 4,664,002 | 5/1987 | Cucchi et al. | 82/2.7 |
| 4,700,593 | 10/1987 | Cucchi | 82/2.5 |

Primary Examiner—William Terrell
Attorney, Agent, or Firm—Guido Modiano; Albert Josif

[57] ABSTRACT

The device comprises a box-like body inside which two shoes are slideable and are actuated in opposition. A shoe is compsed of a plate which has a guiding opening for a gib of the other shoe. Brackets are rigidly and protrudingly associated with the top of the gib and with the lower end of the plate and bear respective jaws which are adapted, in jaw closure position, to define a guiding duct for a bar and, in opening position, a passage for the bar-pusher. The opposite actuation of the shoes is actuated by a shaft controlled by a fluidodynamic jack having arms which bear wheels acting between the bracket supported by the gib and a protrusion of the plate.

2 Claims, 2 Drawing Sheets

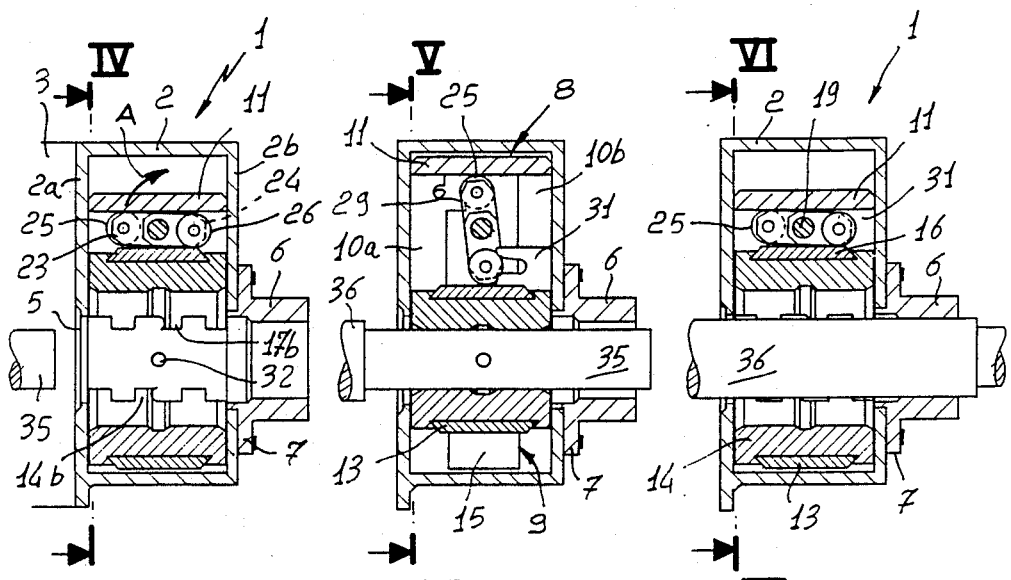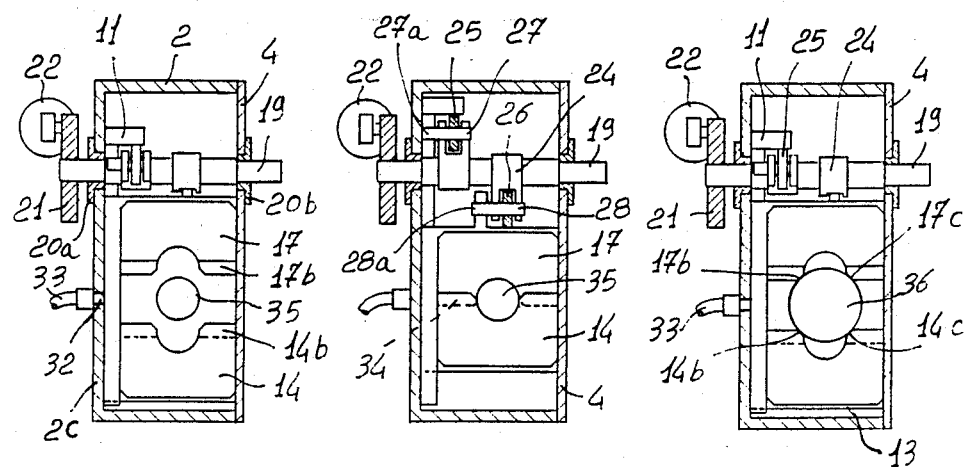

DEVICE FOR IMPROVING THE FEED OF A BAR IN AN AUTOMATIC LATHE FOR MACHINING BARS

BACKGROUND OF THE INVENTION

The present invention relates to a device for improving the feed of a bar in an automatic lathe for machining bars.

As is known, the bar being machined is axially thrust by a pusher in the guiding duct of a loader assembly and into the tubular mandrel of the lathe, within which it rotates with play.

In order to reduce the vibrations which arise therefrom, the bar is guided by a bush or bushing which however does not allow the traversing of the pusher.

SUMMARY OF THE INVENTION

The technical aim of the present invention is to provide a device which allows reducing the vibrations of the bar being machined and is adaptable to guide the bar-pusher.

Within this aim, an object of the present invention is to provide a device which is structurally simple and reliable in operation even in relation to the rough treatment to which such devices are subjected.

This aim and this object are achieved by a device which is characterized in that it comprises a bush or bushing composed of two jaws having semicylindrical cavities and actuated between two positions wherein they define an axial guiding duct for a bar and respectively a passage for the bar-pusher.

BRIEF DESCRIPTION OF THE DRAWINGS

Further characteristics and advantages of the present invention will become apparent from the following description of a preferred embodiment, illustrated by way of non-limitative example in the accompanying drawings, wherein:

FIG. 1 is a sectional view of the device taken along a longitudinal plane in an open position for receiving a bar to be machined;

FIG. 2 is a view of the device of FIG. 1 in closed position for guiding a bar;

FIG. 3 is a view of the same device in its bar-pusher guiding position;

FIGS. 4, 5 and 6 are sectional views taken along the planes IV—IV, V—V and VI—VI respectively of FIGS. 1, 2 and 3; and finally

DESCRIPTION OF THE PREFERRED EMBODIMENTS

Figure 7:
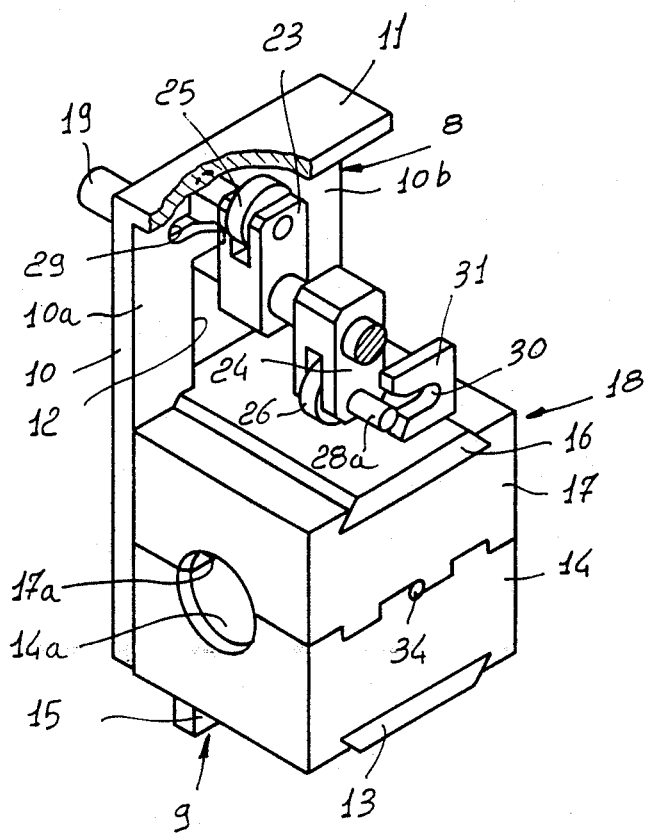
FIG. 7 is a perspective view of the control elements of the semicylindrical jaws.

With reference to the above described figures, the device, generally indicated by the reference numeral 1, comprises a box-like body 2, fixed frontally to the end of a bar loader assembly 3, which is not further illustrated for clarification purposes. The box-like body 2 is laterally closed by a cover 4 and has, on a wall 2a, an opening or axial guiding duct 5 for the entry of the bars and, on the opposite wall 2b, an opening for the exit thereof which continues with a sleeve 6 having a flange 7 with which it is fixed to the box-like body 2. Two sliding blocks or shoes 8, 9 are vertically guided within the box-like body 2 and are actuated to move in opposite directions. The shoe 8 is constituted by a plate 10 frm the upper edge whereof a protrusion 11 extends. The plate 10 is adjacent to the wall 2c of the box-like body opposite to the cover, and the protrusion 11 is perpendicular to said wall.

An opening 12 is provided in the plate 10, having a substantially rectangular configuration and having two parallel vertical edges which act as guides for the shoe 9.

The opening 12 is upwardly delimited by the protrusion 11 and downwardly delimited by a bracket 13 which projects to form a right angle with respect to the plate 10. The opening 12 substantially defines in the plate 10 two parallel strips 10a and 10b the lower ends whereof are connected by the bracket, which however does not occupy the space of the opening 12 related to the thickness of the plate. The bracket 13 therefore forms a bridge-like structure which connects the strips 10a and 10b and defines, together with the opposite faces of the strips and the wall 2c of the box-like body, a passage port for the shoe 9. The bracket 13 has a dovetail cross section for engagement with a correspondingly shaped jaw 14 manufactured from a block of antifriction material having a parallelepipedal shape with a cross section equal to the interior of the box-like body 2 comprised between the opposite faces of the plate 10 and the cover 4 and between the lateral walls 2a, 2b.

A semicylindrical cavity 14a extends on the jaw 14 and its axis a perpendicular to the walls 2a and 2b.

The shoe 9 is composed of a gib 15 guided between the strips 10a, 11b and at the top whereof there is rigidly associated a bracket 16 which is identical and arranged symmetrically with respect to the bracket 13.

A second jaw 17 is coupled to the bracket 16 and is obtained from a block of the same antifriction material as the jaw 14 and has a semicylindrical cavity 17a adapted to define, together with the cavity 14a, a bar passage duct when the jaws 14 and 17 are arranged in mutual contact to form a bush 18. According to another aspect of the invention, the jaws 14 and 17 can be made of metal and act as a support for a layer of antifriction material which covers the cavities 14a and 17a.

The jaws 14 and 17 are actuated to open and close by means of a mechanism which comprises a shaft 19, rotatably supported by supports 20a, 20b accommodated in seats of the wall 2c and the cover 4.

At the end of the shaft 19 which protrudes externally from the wall 2c there is rigidly connected a radial lever 21, to which the stem of a fluidodynamic jack 22 is articulated, the cylinder of said jack 22 being rigidly associated with fixed parts of the loader. Two arms 23, 24 are keyed on the portion of the shaft which is located internally of the box-like body, extend in diametrally opposite directions, and have a fork-like shape to support two respective wheels 25, 26 in tangential engagement on the lower face of the protrusion 11 and on the upper face of the bracket 16.

The wheels 25, 26 are freely mounted on pivots 27, 28 which extend with a respective portion 27a, 28a laterally to the arms 23 and 24.

The portions 27a and 28a of the pivots 27, 28 are intended to engage in notches 29 and 30 formed in the strip 10a immediately below the protrusion 11 and respectively in a small plate 31 welded above the bracket 16.

The jaws 14 and 17 have, on the faces intended to make contact, sets of teeth 14b and 17b adapted for mutual engagement to ensure greater solidity of the bush 18.

The described device is completed by a hole 32 provided in the wall 2c and radiused to a tube 33 for feeding a lubricating liquid which is conveyed into the duct 14a, 17a of the bush 18 to lubricate the rotating bar through a hole 34 defined between the opposite faces of the jaws 14 and 17 and aligned in the hole 32 when the jaws are mutually engaged.

The operation of the device will become apparent from the foregoing description. The bush 18 is initially placed in an open condition, with the jaws 14 and 17 spaced apart to allow the insertion of the end of the bar 35.

When the bar is inserted between the jaws 14 and 17, the activation of the jack 22 determines the rotation of the shaft 19 and the arms 23, 24 in the direction of the arrow A; said arms, by means of wheels 25, 26 engaged below the protrusion 11 and above the bracket 16, moving the shoes 8 and 9 in opposite directions.

It should be noted that in the position of FIG. 1 the portions 27a and 28a of the pivots 27, 28 are engaged in the notches 29 and 30. The engagement of the portion 28a in the notch 30 prevents the shoe 9 from sliding due to its own weight when the jaws 14 and 17 are in an open position (FIG. 1), while the engagement of the portion 27a in the notch 29 ensures the positive actuation of the shoe 8 and the descent of the jaws 14 when the jaws are moved mutually closer.

When the jaws 14 and 17 have been moved into engagement (FIGS. 2 and 5), a passage or bush for the exact guiding of the bar 35 is defined, the vibrations of said bar being thus effectively eliminated for the entire duration of the advancement of the bar.

At the same time the feeding of lubricating oil through the tube 33 and the holes 32 and 34 makes the rotation of the bar smoother.

Once the machining of the bar is completed, the jaws 14 and 17 are opened to allow the passage of the bar pusher 36 which, as is more clearly illustrated in FIG. 6, remains guided between the passage defined by four edges 14b, 14c and 17b, 17c which the cavities 14a and 17a form with the opposite planar faces of the blocks 14 and 17. Said edges are conveniently rounded to provide a greater surface area of contact with the bar-pusher 36.

The described invention is susceptible to numerous modifications and variations. For example, the jaws 14 and 17 may be easily replaced with others having the semicylindrical cavities 14a and 17a configured for different diameters. The replacement can be easily executed by removing the cover 4 and extracting the jaws from the respective brackets.

Furthermore in the place of the jack 22 it is possible to provide an actuator of another type, e.g. an electromechanical device.

I claim:

1. A device for improving guiding of a bar and a bar-pusher in a bar loader assembly for feeding bars to an automatic lathe comprising
   a box-like body fixed to said bar loader assembly;
   an entry and an exit opening for the bar formed in said box-like body;
   a sliding plate vertically guided inside said box-like body and having a lower end;
   a first bracket fixed to said lower end and projecting from said plate;
   an opening formed in said plate and defining a vertical sliding guide;
   a gib in sliding engagement with said opening and having a top end;
   a second bracket fixed to said top end;
   a first and a second jaw rigidly connected to said first and second bracket respectively, said jaws having semicylindrical cavities facing one another;
   means for moving said jaws in opposite directions between a closure position wherein said jaws abut together to define a duet for guiding the bar and an open position wherein said jaws are spaced one another to define a passage for guiding the bar-pusher, said bushing and passage being in alignment with said entry and exit openings.

2. A device according to claim 1, wherein said sliding plate comprises two parallel strips defining said opening and a protrusion projecting from said sliding plate and arranged above said second bracket and wherein said means for moving said jaws in opposite directions comprises a shaft rotatably supported inside said box-like body, two arms rigidly connected to said shaft and extending in diametrically opposite directions, two pivots each mounted on a respective arm and parallely to said shaft, two wheels idly mounted on said pivots and in tangential engagement on said protrusion and on said second bracket, a small plate rigidly connected above said second bracket, notch formations formed in one of said strips below said protrusion and in said small plate, said pivots having respective portions laterally projecting from said arms and engaging said notch formations, said shaft having an end extending externally from said box-like body, a lever rigidly connected to said external end and an actuator acting on said lever to rotate said shaft and to move said sliding plate and said gib between said closure and open positions of said jaws.

* * * * *